Dec. 16, 1969

J. D. STEWART 3,484,137

COMPOSITE NON-FERROUS WHEEL HAVING A STEEL RIM
AND METHOD OF MAKING THE SAME

Filed Jan. 25, 1968

INVENTOR
JERRY D. STEWART
BY
Lyon & Lyon
ATTORNEYS

United States Patent Office 3,484,137
Patented Dec. 16, 1969

---

3,484,137
COMPOSITE NON-FERROUS WHEEL HAVING A STEEL RIM AND METHOD OF MAKING THE SAME
Jerry D. Stewart, Los Angeles, Calif., assignor to Shelby Parts Co. Inc., Subsidiary of Shelby America Inc., Torrance, Calif., both corporations of California
Filed Jan. 25, 1968, Ser. No. 700,458
Int. Cl. B60b 1/08
U.S. Cl. 301—65      3 Claims

ABSTRACT OF THE DISCLOSURE

A composite wheel having a cast, non-ferrous center including a hub and a plurality of spokes, whereby the center is press-fit into a steel rim and the center is secured within the rim by means of welded plugs attached to the inner periphery of the rim and extending through radial bore holes provided in the spokes.

---

The present invention relates to wheels and primarily to automobile wheels.

Recently it has become a practice to fabricate automobile wheels of non-ferrous materials in order to decrease the weight thereof and to create decorative effects for custom wheels. The practice has been to fabricate the wheel rims of steel but to fabricate the centers using the lighter weight materials, such as aluminum or magnesium. By casting the non-ferrous centers, they may be produced inexpensively with different designs. In addition, the amount of offset can be readily varied to give a wider track if desired. The difficulty has been to securely attach the non-ferrous wheel center to the steel rim since you cannot directly weld or fuse aluminum or magnesium to steel. Current practice involves the use of a steel insert cast within the body of the non-ferrous center whereupon the steel insert may be readily welded to the steel rim. Several patents have been issued concerning the application of this principle including Richter 3,250,571 and Walker 3,250,572 and a patent has also issued on the method of making a composite wheel issued to Benton et al., 3,302,273.

The difficulty with the use of a steel insert as disclosed by the above-mentioned patents is not so much in its performance characteristics but in its involved method of manufacture. Wheels made in accordance with any of the above patents seem to perform satisfactorily in that sufficient strength appears to be obtained for both rotational and lateral stresses. As outlined in the Benton patent, however, the method of fabricating such a wheel using the inserts involves many steps, including the casting of the aluminum wheel while holding the insert in the proper position then the removal of the radially-extending portion of the insert by machining it until its outer periphery is aligned with the outer periphery of the wheel spoke and then welding the edge of the insert to the inner periphery to the wheel rim. The wheels disclosed in the two apparatus patents, above-mentioned, are fabricated in a similar manner in that the separate steps of casting the wheel center with the insert in place and then machining the insert and the outer periphery of the spoke before welding the insert to the steel rim are included as necessary steps.

Difficulties are encountered in following the procedures of the above-mentioned patents in that the step of carefully holding the insert in place while the non-ferrous wheel center is cast requires some degree of care and necessarily slows down manufacturing operations. Even more important, the machining of the steel insert is difficult because when the edge of the insert is aligned with the outer periphery of the spoke, both surfaces are machined at once and the simultaneous machining of two dissimilar metals is tedious and costly. If the cutting tool is sufficiently sharp to cut the steel insert, it does a poor job of cutting the aluminum, and the contrary is true if the tool is properly sharpened for cutting the aluminum.

The present invention obviates the afore-mentioned difficulties by eliminating entirely the use of a steel insert and thereby also eliminating that portion of the manufacturing procedures involved in casting the insert in place and machining it. The present invention teaches the casting or drilling of radially-extending bore holes through the end flanges of the non-ferrous spokes whereby the wheel centers may be securely affixed within the steel rim by a relatively simple welding operation.

It is an object therefore of the present invention to provide an improved composite wheel having a non-ferrous center and a steel rim.

More specifically, it is an object of the present invention to provide an improved composite wheel whereby the non-ferrous center is secured to the steel rim without the necessity for steel inserts or the like.

Further objects and advantages of the present invention will be readily apparent upon reading the ensuing detailed description in conjunction with the drawings, in which.

Figure 1:
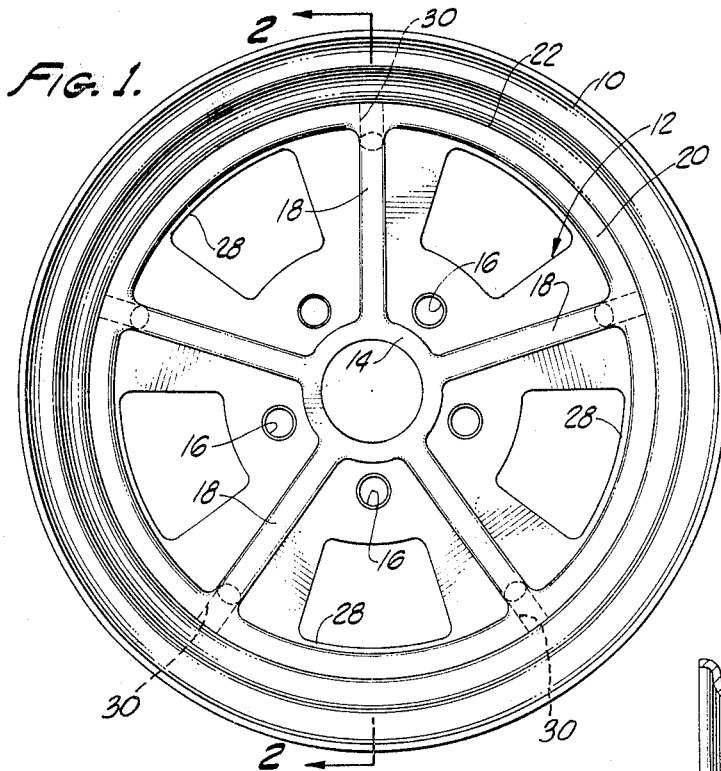
FIGURE 1 is a plan view of a composite wheel made in accordance with the present invention.

In FIGURE 1 the wheel rim is designated 10 and the non-ferrous wheel center is designated generally 12. The wheel center 12 has a hub 14 adapted to surround an extension of the axle and has apertures 16 to receive the anchor studs. In the non-ferrous wheel center 12 there are provided a plurality of spokes 18 extending radially outward from the hub 14 and these spokes 18 may have any one of a desired number of cross-sectional configurations, it only being important that the configuration imparts sufficient strength to the wheel center 12.

Figure 2:
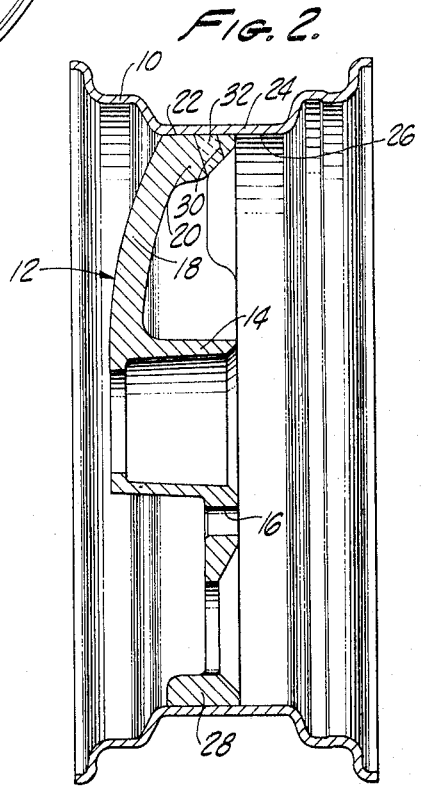
FIGURE 2 is a sectional side elevation taken along line 2—2 of FIGURE 1.

The extremity of each spoke is provided with a flange 20 having a curved outer surface 22. As shown in FIGURE 2, the cross-sectional view of the wheel rim 10 is of ordinary design adapted to receive a tire therein, and the central section 24 of the rim 10 provides a substantially flat peripheral surface 26 along the inner portion thereof. In the embodiment of the present invention it is shown that the spokes are joined along their outer extensions by curved webs 28. Although the spokes may be separate without the joining webs 28, it is preferred to provide the sections 28 to facilitate machining techniques and to provide a better press-fit by increasing the surface area of contact.

The wheel center 12 is cast of aluminum or other suitably light, non-ferrous material. In the mold there are provided means for forming a bore hole 30 in the flange 20 of each of the spokes 18 whereby the bore hole 30 extends substantially radially outward and communicates with the outer periphery 22 of each spoke. The spokes may also be cast without the bore holes, as they may be drilled later. After the wheel center 12 has been cast, the outer periphery 22 is then machined down until the outer diameter is slightly oversized as compared to the inner diameter along surface 26 on the inside periphery on the rim 10. As previously mentioned, the joining webs 28 between the spokes 18 facilitate this machining process since the machining can be done over the smooth circular surface more deadily than over discontinuous surfaces provided by the separate spokes.

After the wheel center has been machined it is then inserted into the rim by a press-fit whereby it will be firmly seated in place in the rim 10. The press-fit is not, by itself sufficient to maintain an aluminum wheel center in place within the rim, particularly with respect to lateral forces tending to force the center out of the rim. In order to securely anchor the center in the rim, the rim surface 26 is welded through the bore holes 30, filling the holes 30 with steel plugs 32. This welding operation secures a plug of steel 32 to the inner surface 26 of the rim and is done in a relatively short time so that only the inner walls of the bore hole 30 are softened by the heat of this welding operation so that deformity of the extremities of the spoke will not take place. When the steel plug cools, the molten aluminum surrounding the plug will resume its original configuration and will contract adhering tightly to the steel plug.

Figure 4:
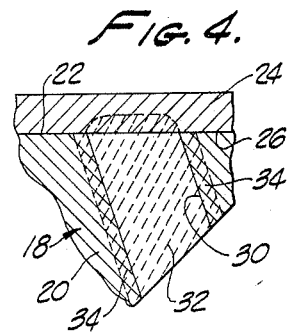
FIGURE 4 is a partial sectional elevation showing an enlarged detail of the attachment of the wheel center to the rim.
Figure 3:
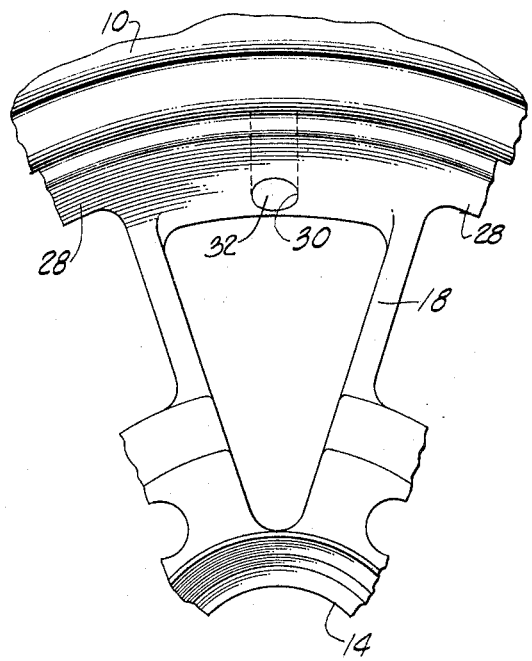
FIGURE 3 is an enlarged partial plan view of the rear of a composite wheel spoke showing the attachment means.

Referring to FIGURE 4, the steel plug is shown at 32 and although it appears to extend into the surface 26 of the rim 10 this is shown so as to demonstrate that a bond is maintained between the surface 22 and the plug 32. In addition, the partial melting of the aluminum in the spoke 18 and the resolidification thereof is demonstrated by the shaded portion 34 surrounding the periphery of plug 32.

It will thus be seen that the present invention provides an improved composite wheel as well as in improved method of making the same eliminating the necessity for separate elements such as the steel inserts previously mentioned and provides an equally strong assembly. It will also be noted, that the technique of manufacturing the present invention not only eliminates the step of inserting the steel insert but also eliminates a necessity for machining two dissimilar metals and obtaining the curved surfaces on the outer periphery of the spokes prior to inserting the wheel center in the rim. While a particular embodiment of the present invention has been shown and described herein, it will be obvious to persons skilled in the art that changes or modifications might be made without departing from this invention.

I claim:
1. A composite wheel comprising:
   a steel wheel rim;
   a non-ferrous wheel center, said wheel center having a hub and a plurality of radially-extending spokes, each spoke including a flange on the outer extremity thereof, a radial bore hole through each such flange, said spokes having an outer peripheral surface adapted to conform to the inner peripheral surface of said steel rim; and
   a plurality of steel plugs, each of said plugs welded to an inner peripheral surface of said rim and projecting into said spokes through said bore holes.
2. A wheel of the type described in claim 1 wherein said bore holes are adapted to receive said steel plugs therein, said plugs being formed of weld material.
3. A method of fabricating a composite wheel having a steel rim and a non-ferrous center, the steps comprising:
   casting a non-ferrous wheel center with a plurality of radially projecting spokes, forming radial bore holes through said spokes;
   machining the outer diameter of said spokes to a dimension slightly greater than the inside diameter of said rim;
   press-fitting said wheel center into said rim;
   welding a plug through each of said bore holes to the inner surface of said wheel rim.

References Cited

UNITED STATES PATENTS

| 2,220,284 | 11/1940 | Roemer | 29—159.03 X |
| 3,204,083 | 8/1965 | Fromm | 219—127 |
| 3,250,571 | 5/1966 | Richter | 301—65 |
| 3,250,572 | 5/1966 | Walker | 301—65 |
| 3,329,468 | 7/1967 | Beith | 301—65 X |
| 3,410,606 | 11/1968 | Benton | 301—65 |

RICHARD J. JOHNSON, Primary Examiner

U.S. Cl. X.R.

29—159.03; 219—127